March 4, 1930.  M. T. RUDDY  1,749,547
DOWEL PIN CONSTRUCTION
Filed Aug. 16, 1926
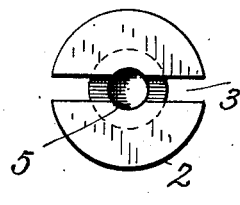
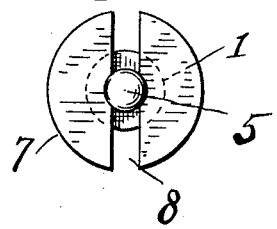
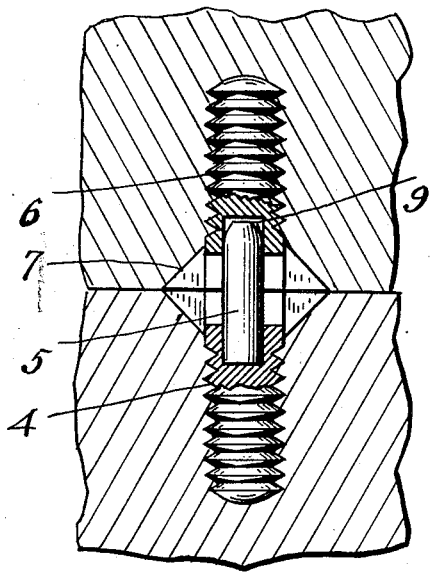
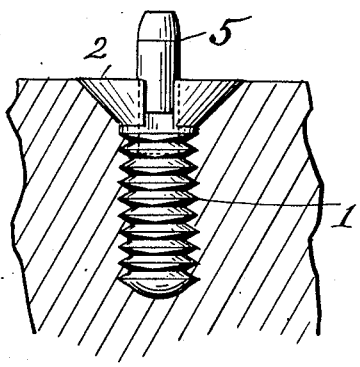
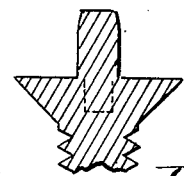
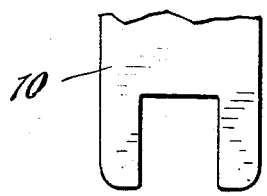

Patented Mar. 4, 1930

1,749,547

UNITED STATES PATENT OFFICE

MARTIN T. RUDDY, OF LAKEWOOD, OHIO

DOWEL-PIN CONSTRUCTION

Application filed August 16, 1926. Serial No. 129,630.

This invention relates to what may be termed a dowel pin construction or any similar structure wherein it is desired to position one member with respect to another member, to bring them into some predetermined exact position.

One of the most frequent uses for a structure of this kind is in the matter of patterns and core boxes which are made in one or more parts, which must be readily assembled and disassembled and when assembled the various parts must be positioned with exactness with respect to each other.

Among the advantages of construction which is herein described, is the fact that the male and female members of the dowel pin structure are of metal and may be definitely and exactly anchored in the structure with which they are associated so that continued usage will not cause a sufficient amount of wear or displacement of parts so that the position of the structures, of which the present construction forms a part, would get out of proper relative position.

A further advantage of the construction lies in the fact that the parts are basically of standard U. S. screw construction so they may be produced at low cost of manufacture.

Reference should be had to the accompanying drawings in which

Fig. 1 is a sectional elevation with portions in full line showing the assembled male and female members;

Fig. 2 is an elevation of the male member;

Fig. 3 is an end elevation of the male member;

Fig. 4 is an end elevation of the female member;

Fig. 5 shows a portion of a tool which may be employed to insert or remove the respective parts of the dowel pin construction from the structure in which it is to be mounted; and Fig. 6 is an elevation of a modified form of male member.

The male member of the dowel pin construction comprises a screw threaded shank or body portion 1, which at its end is provided with a conical shaped head 2. This head is provided on its outer surface with a slot 3. The structure so far described is practically that which is common to ordinary wood screws.

In making the male member, the head of it is provided with a socket or recess 4 and into the socket is inserted a pin 5. The pin has a driving fit so that when it is once inserted in the socket 4, it becomes to all intents and purposes an integral part of the male member.

Obviously, the pin may be made integral with the body when such is desired, as shown in Fig. 6.

The female member is provided with a threaded body or shank 6, which at its end has a conical head 7, which head is provided with a slot 8 and with a socket 9.

In using these two members as a dowel pin construction, the body portions of the parts will be screwed into the structure in which they are to be mounted, as for instance, the parts of pattern and core boxes, etc., and when they are deeply inserted, the surface of the head of each of these members will lie flush with the surface of the part into which they are inserted. In assembling the parts in which the dowel pin members are mounted, the pin 5 will be inserted in the socket 9, thereby effectively holding the members in which the dowel pins are mounted from relative lateral displacement.

The anchorage which is given the bodies of the dowel pin construction in the structures in which they are mounted is sufficient to insure their permanency and freedom from movement. Further the metallic pin 5 engaging with the socket of proper dimension in the other member of the dowel pin will insure a retention free from play or lateral movement. And this condition will remain, even after repeated assembling and disassembling of the structures of which the dowel pin construction forms a part.

In Fig. 5 there is shown one end of a tool 10. This tool is bifurcated for the purpose of straddling the pin 5, so that the ends of the tool may be inserted in the slot 3 for the purpose of inserting or assembling the male member from the structure in which it is located.

Having thus described my invention, I claim—

A dowel pin construction comprising two axially opposed members, each of said members having a threaded shank and a transverse slot at one end whereby the members may be inserted into an object, said members each having an axial socket formed in the shank, and a pin carried by the socket of one of said members and adapted to be inserted into the socket of the other member.

In testimony whereof, I hereunto affix my signature.

MARTIN T. RUDDY.